July 19, 1938. P. R. MARTIN 2,124,233
TREATMENT OF CALCIUM MAGNESIUM CHLORIDE
Filed Dec. 3, 1934
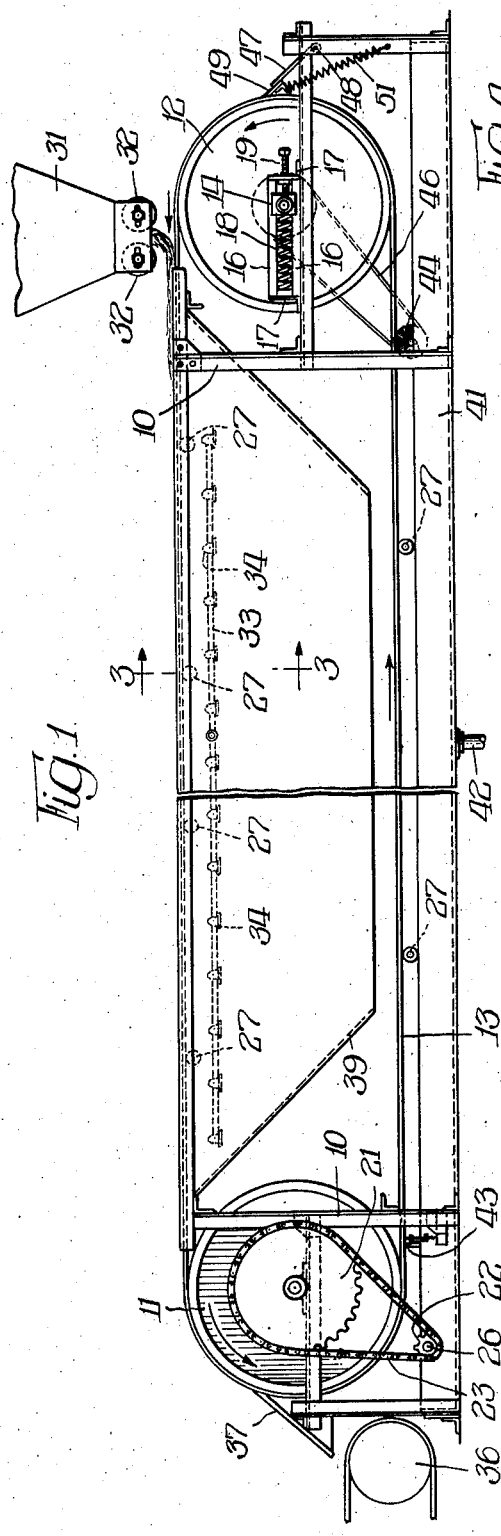
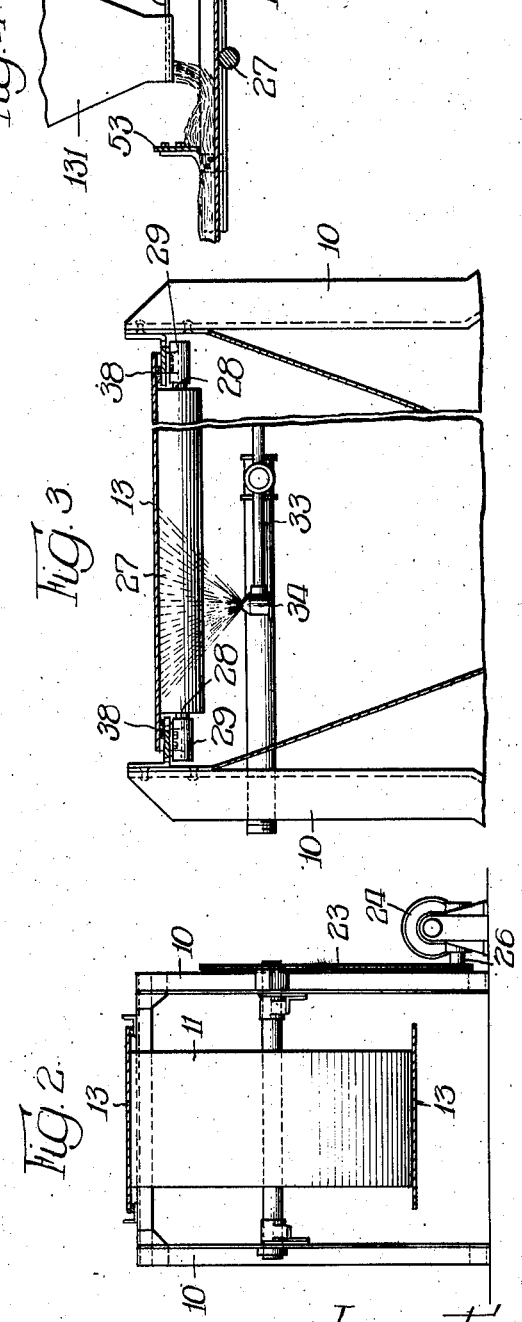
Inventor:
Peter R. Martin
By John J. McLaughlin
Atty.

Patented July 19, 1938

2,124,233

UNITED STATES PATENT OFFICE 2,124,233

TREATMENT OF CALCIUM MAGNESIUM CHLORIDE

Peter R. Martin, Chicago, Ill., assignor to Fuel Treating Products Co., Chicago, Ill.

Application December 3, 1934, Serial No. 755,746

3 Claims. (Cl. 62—104)

My invention relates to the treatment of materials, particularly to the treatment of calcium magnesium chloride and similar materials, to recover them in a substantially dry solid pulverulent form.

According to some methods for obtaining sodium chloride when deposits thereof are found underground, the salt is dissolved in water and the brine pumped to the upper surface and processed for the removal of sodium chloride therefrom. Other valuable products are also obtained, such as bromine and the final substance subsequent to the evaporation of most of the water therefrom consists principally of so-called calcium magnesium chloride which is in itself a mixture of various combinations of the three elements mentioned and, at elevated temperatures is a rather thick, pasty mass. In recent years it was found that this material has valuable properties, resulting principally from its hygroscopicity; for example, it is spread over freshly laid concrete and by attracting moisture from the air increases the setting time of the cement with the result that an improved concrete product is produced.

The recovery of the calcium magnesium chloride in a suitable condition for shipping has been a considerable problem. According to the method heretofore employed, the dark looking residue was heated for a considerable time to about 350° F. to drive off water. This liquid was then poured into drums, allowed to cool for 24 hours or longer and more hot liquid added to take care of shrinkage during the cooling. The product was then left to stand as long as several weeks, depending upon the nature of the weather, before it was sufficiently solid for use. The drum was then broken away from around the solid salt body and the solid salt body broken up by hand labor, using sledges, etc. The relatively large pieces formed by hand labor were then ground and the final product was a mixture of pulverulent material and lumps ranging from ¼" to 2" in diameter. The process used heretofore was expensive, required a great deal of time and was generally objectionable, but no other suitable means for processing the material was found in spite of considerable investigation.

The principal object of my invention is the provision of an improved means and method for treating calcium magnesium chloride and similar hygroscopic materials. Another object is the provision of a method of and means for treating the material continuously to reduce it to solid pulverulent form. Other objects and features of the invention will be apparent as the detailed description progresses.

In general, I accomplish the object of my invention by spreading the material onto a relatively thin metal plate which is preferably in the form of a belt of sheet steel, chill the plate by suitable means, for example spraying the underside of the plate with cool or cold water, and cause the material to be broken off of the plate in the form of chips or flakes which are in themselves of a suitable size but which are readily broken into smaller fragments by suitable comminuting apparatus.

One embodiment of the mechanism for carrying out this process is shown in the accompanying drawing, wherein—

Fig. 1 is a fragmentary elevational view, partly in section, showing the preferred form of the apparatus;

Fig. 2 is an end view looking at the discharge end of the apparatus, part of the apparatus being removed and the metal belt shown in section to indicate the relationship of the parts;

Fig. 3 is an enlarged fragmentary sectional view taken on the line 3—3 of Fig. 1; and Fig. 4 is a fragmentary elevational view, partly in section, showing a modified feeding means.

Referring now to the drawing, the mechanism shown comprises a frame 10 of suitable shape to support the operating parts of the mechanism on which is rotatably carried a pair of pulleys 11 and 12 around which travels an endless rust-resisting steel belt 13. The pulley 11 is journalled in fixed bearings carried by an extension of the frame 10 while the pulley 12 has a center shaft journalled in a pair of blocks 14 (one is shown in Fig. 1) shaped like a cross head and slidable between a pair of rails 16, supported by a pair of angles 17, secured to a frame extension. Springs 18 move the blocks 14 in a direction to apply tension to the belt and adjusting screws 19 are provided for limiting the tension on the belt or for decreasing the tension sufficiently to make possible an easy removal or adjustment of the belt.

The pulley 12 is an idler, the drive being entirely through pulley 11 at the delivery end of the apparatus. A sprocket gear 21 is secured to turn with the pulley 11 by either being secured to the pulley shaft or secured to the end thereof. A driving sprocket gear 22 is provided, a sprocket chain 23 serving to transmit motion of the driving sprocket 22 to the sprocket 21. A motor 24 (Fig. 2) carried on a separate frame, suitably supported as, for example, on the floor, dr s a shaft 26 which carries the driving sprocket gear 22. Preferably I provide speed reducing gears between the motor shaft and the shaft 26, as indicated generally in the drawing. I may, however, employ a large relatively low speed motor with suitable results.

The belt is supported by suitable means intermediate its length. In the drawing I show a plurality of rollers 27 carried on shafts 28 journalled in bearings 29, carried on the frame by means of angles or other suitable frame extensions. These rollers are employed at top and bottom, the roller shafts being shown only in Fig. 3 and identified by the reference character 28.

The calcium magnesium chloride or other material treated is delivered through a hopper 31. In the preferred embodiment I show the hopper equipped with a pair of rollers 32 adjustable with respect to each other so as to provide a feeding space therebetween and of approximately the same width as the belt 13. By adjusting the rollers, a layer of the material to be treated of substantially the exact thickness desired can be applied continuously to the belt as it moves in the direction indicated by the arrows. It will be noted that although the ribbon of material passes almost directly downwardly, the movement of the belt causes the material to spread out uniformly in the direction which the belt takes.

The belt is cooled by applying cooling means to the bottom surface of the upper reach thereof. A suitable and very satisfactory cooling means is water. For the utilization of water at proper temperature I provide a pipe system 33 equipped with a number of sprinkler heads 34 so arranged as to cause the water to strike substantially the entire lower area of the belt. The water is delivered to the pipe system under sufficient pressure to produce a proper spray action. The pressure may be regulated by means well known in the art to deliver a sufficient amount of water to cause a proper cooling action. If the water is relatively warm, more of it may be required; while relatively cold water need not be supplied in the same quantities to produce the same result. I have found that water having a temperature of as high as 80 or 85° F. can be used with fair results although water somewhat colder is preferred. Since the apparatus is designed so that extremely cold water is not necessary, the apparatus can be supplied usually by pumping water from natural sources, such as rivers, even during the latter part of the summer when the temperature thereof is relatively high. I have found that well water can be used to very great advantage because its temperature will be uniform within a few degrees during the entire year and less adjustment is required to be made from season to season.

By the use of an adjustable feeding means, the thickness of the layer of material applied to the belt can be regulated. This is another adjustment which can be made to allow for difference in weather conditions and the temperature of the cooling water employed. In general, the thickness of the material should be between approximately $\frac{3}{32}$ of an inch and ¼ of an inch. I make the layer thin enough so that the material will solidify before it reaches the end of its travel path on the belt but at the same time as thick as possible consistent with proper performance in order to increase the capacity of the machine.

The material is in the form of a substantially solid sheet by the time it reaches the pulley 11. The angular travel of the belt at this point has the effect of partly breaking up the material and causing it to fall by its own weight around the periphery of the pulley 11 and be discharged into or onto suitable handling apparatus, for example, a conveyor 36, indicated schematically in Fig. 1. As a precaution, however, and to positively remove such material as may adhere to the belt, I provide a take-off scraper 37. The material delivered to the conveyor 36 is in the form of thin chips suitable for use for most purposes, but capable of being readily broken up further if necessary. I have found that if the material has been decreased in temperature to approximately 85° F. it will solidify sufficiently.

In order to prevent the cooling water from reaching the top of the belt, I provide two strips of felt 38 or other sealing material between the frame and the belt. To support the felt in the embodiment shown, I use the same angular portion of the frame which supports the bearings for the rollers 27. I may, however, provide any other suitable seal at the edges of the belt for preventing the cooling liquid from reaching the top of the belt.

The pipe system is disposed within a shielding housing 39 having generally the shape of an inverted truncated cone. This housing 39 is closed at the top by the belt itself and the frame to which it is secured. It is open at the bottom, however, so as to direct the water downwardly to the lower section of the belt after it has fallen by gravity following its contact with the upper portion of the belt. Below the lowermost portion of the belt I provide a continuous trough 41 with a drain 42 for continuously removing water after it has run off the lower section of the belt. This not only helps to keep the belt clean but it also cools it somewhat and conditions it for the reapplication of the material being treated after this lower portion of the belt reaches the hopper 31.

In the further conditioning of the belt I provide a spring-pressed cleaning scraper 43 which removes whatever traces of the calcium magnesium chloride may be left after the belt passes the scraper 37. I also provide a cleaning brush 44 driven by a belt or chain 46 from the idler pulley 12. At the feeding end of the apparatus I also provide a drying mechanism for the belt comprising a plate 47 pivoted at 48 and having a rubber water removing portion 49 in contact with the belt as it passes over the end of the pulley. A tension spring 51 serves to hold the rubber in contact with the belt. The rubber portion 49 running entirely across the belt removes the water with a so-called squeegee action.

In Fig. 4, I show a modified feeding arrangement in which a hopper 131 has an adjustable sliding gate 52 so arranged as to provide a slit or slot running transversally of the belt to discharge the calcium magnesium chloride in proper amounts. I also provide an adjustable spreader 53 for smoothing out the applied material. A similar leveling mechanism can, of course, be employed in the main feed embodiment.

I have found that, with equipment such as that disclosed, calcium magnesium chloride can be delivered to the cooled metal surface at about 350° F. and removed continuously from the belt as it passes around the pulley 11 in a solidified condition. There is no limit except a practical one to the length of the steel belt employed and for this reason the portion of the belt broken away is to be considered of indefinite length.

I have found that with a belt having a total length of 35 feet a relatively large output can be obtained even though the water is not less than about 65 or 70° F. in temperature. For best results, the material delivered from the belt should not be more than about 85° F.

The material is either delivered to the conveyor indicated at 36, or to a bin or hopper preparatory to bagging. If it is delivered to the conveyor mechanism, it may also be packaged immediately and without further processing, or it may be ground finer. Since it is recovered in the form of chips or flakes, it is in very good condition for subsequent treatment by comminuting apparatus.

It is understood that I may, if desired, employ special cooling equipment. For example, cooling water or other liquid may be passed in contact with expansion coils of an ice machine, the liquid cooled, sprayed against the lower side of the belt, and the liquid then again returned to be passed again in contact with the cooling coils of the refrigerating equipment. Inasmuch as the material handled sells at a relatively low price and since it is not necessary under most conditions to reach a very low temperature, I find that adequate results are obtained if water is used no cooler than that found in natural sources such as lakes, rivers, or underground sources through wells and the like. Since more naturally cooled water is employed, I also find that a greater range is obtained without the necessity of using extremely fine adjustments or control.

Wherever the term "calcium magnesium chloride" is employed in this specification and claims, it will be understood to mean the thick, pasty material described in the first part of the specification.

What I claim as my invention and desire to have protected by United States Letters Patent is:

1. The herein described apparatus for treating calcium magnesium chloride and similar hygroscopic materials to solidify them which comprises a pair of pulleys, a relatively wide and long endless metal belt extending around said pulleys, means for driving said pulleys to continuously advance the belt, means for applying a layer of the material to be treated to the belt adjacent one of said pulleys, means for supplying a cooling liquid onto the surface of said belt below the position occupied by said material, and means for causing said cooling liquid to be discharged on to another portion of said belt whereby to pre-cool the same before the application of the material to such portion.

2. The herein described apparatus for treating calcium magnesium chloride and similar hygroscopic materials to solidify them which comprises a pair of pulleys, a relatively wide and long endless metal belt extending around said pulleys, means for driving said pulleys to continuously advance the belt, means for applying a layer of the material to be treated to the belt adjacent one of said pulleys, means for supplying a cooling liquid onto the surface of said belt below the position occupied by said material, means for causing said cooling liquid to be discharged on to another portion of said belt whereby to pre-cool the same before the application of the material to such portion, and means for drying said belt after the application of said liquid thereto.

3. The herein described apparatus for treating calcium magnesium chloride and similar hygroscopic materials to solidify them which comprises a pair of pulleys disposed in a substantially horizontal plane, a relatively wide and long endless metal belt extending around said pulleys, means for driving said pulleys to continuously advance the belt, means for applying a layer of the material to be treated to the belt adjacent one of said pulleys, means for supplying a cooling liquid onto the surface of said belt below the position occupied by said material, means for causing said cooling liquid to be discharged onto another portion of said belt whereby to pre-cool the same before the application of the material to such portion, and means for drying said belt after the application of said liquid thereto.

PETER R. MARTIN.